United States Patent
Gowda et al.

(10) Patent No.: US 10,327,971 B2
(45) Date of Patent: *Jun. 25, 2019

(54) BIDIRECTIONAL FLUID FLOW VALVE AND METHOD

(71) Applicant: KAP Medical, Corona, CA (US)

(72) Inventors: Raj Krish Gowda, Corona, CA (US); David Darwin Lewis, Yorba Linda, CA (US); Daniel Francis Rosenmayer, Corona, CA (US)

(73) Assignee: KAP Medical, Corona, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 15/581,568

(22) Filed: Apr. 28, 2017

(65) Prior Publication Data

US 2017/0224564 A1    Aug. 10, 2017

Related U.S. Application Data

(62) Division of application No. 14/208,766, filed on Mar. 13, 2014, now Pat. No. 9,662,253.

(Continued)

(51) Int. Cl.
| | |
|---|---|
| *F16K 15/20* | (2006.01) |
| *A61G 7/057* | (2006.01) |
| *F16K 17/26* | (2006.01) |
| *F16K 11/048* | (2006.01) |
| *F16K 11/07* | (2006.01) |

(Continued)

(52) U.S. Cl.
CPC ..... *A61G 7/05769* (2013.01); *A61G 7/05776* (2013.01); *F16K 11/048* (2013.01); *F16K 11/07* (2013.01); *F16K 17/26* (2013.01); *F16K 31/04* (2013.01); *F16K 31/05* (2013.01); *F16K 37/0041* (2013.01); *Y10T 137/0396* (2015.04);
(Continued)

(58) Field of Classification Search
CPC ................ Y10T 137/86622; Y10T 137/86694
USPC ........... 5/706, 710; 137/223, 565.16, 625.65, 137/625.27, 625.67; 251/266, 267
See application file for complete search history.

(56) References Cited

U.S. PATENT DOCUMENTS

| | | |
|---|---|---|
| 3,667,075 A | 6/1972 | Ballard et al. |
| 4,798,227 A | 1/1989 | Goodwin |

(Continued)

FOREIGN PATENT DOCUMENTS

WO    2011/112096 A1    9/2011

OTHER PUBLICATIONS

European Patent Office; EP Office Action; Application No. 14722027.1; dated Jan. 18, 2018.

(Continued)

*Primary Examiner* — Robert K Arundale
(74) *Attorney, Agent, or Firm* — Faegre Baker Daniels LLP

(57) ABSTRACT

The present disclosure relates to a bidirectional valve design that provides for more rapid deflations/evacuation of fluid flow and in one example includes a valve body, a spindle piston movably coupled in a bore of the valve body and an electronically controllable motor that moves the spindle valve between a fluid evacuation position and a fluid fill position. In one example, the spindle piston includes piston structures on ends of a threaded rod. In another example, a mattress system is disclosed that employs the valve and a fluid source to provide quick evacuation of air from a patient (Continued)

support. In another example, the valve is coupled to an alternating pressure block valve which is then coupled to a patient support.

6 Claims, 12 Drawing Sheets

Related U.S. Application Data

(60) Provisional application No. 61/790,210, filed on Mar. 15, 2013.

(51) Int. Cl.
    *F16K 31/04*     (2006.01)
    *F16K 31/05*     (2006.01)
    *F16K 37/00*     (2006.01)

(52) U.S. Cl.
    CPC .. *Y10T 137/7779* (2015.04); *Y10T 137/86002* (2015.04)

(56) References Cited

U.S. PATENT DOCUMENTS

| | | |
|---|---|---|
| 5,269,343 A | 12/1993 | Trapp |
| 6,892,405 B1 | 5/2005 | Dimitriu et al. |
| 2007/0251588 A1 | 11/2007 | Linder et al. |
| 2012/0018003 A1 | 1/2012 | Ho |
| 2014/0261723 A1 | 9/2014 | Gowda et al. |

OTHER PUBLICATIONS

European Patent Office; International Search Report and Written Opinion; International Application No. PCT/US2014/027891; dated Nov. 13, 2014.
US Patent Office; Final Office Action; U.S. Appl. No. 14/208,766; dated May 18, 2016.
US Patent Office; Non-Final Office Action; U.S. Appl. No. 14/208,766; dated Feb. 22, 2016.
European Patent Office; EP Office Action; Application No. 14722027.1; dated Apr. 25, 2017.

BIDIRECTIONAL FLUID FLOW VALVE AND METHOD

RELATED APPLICATIONS

This application is a divisional of application Ser. No. 14/208,766, filed Mar. 13, 2014, which claims priority to Provisional Application Ser. No. 61/790,210, filed on Mar. 15, 2013, and are incorporated herein by reference.

BACKGROUND

The present disclosure relates generally to fluid-inflatable pads and bed systems for supporting the weight of a user particularly for therapeutic and medical applications.

Both patients and patient service providers benefit from products that provide features that increase therapeutic effectiveness, provide greater patient comfort and/or reduce patient cost. Part of the patient care services provided by patient service providers includes the administering of certain therapies while a patient is in bed. Such therapies include those that are directly related to the damage caused to the skin of a patient due to long periods of time spent in bed. For example, moving a patient, while in bed, can help prevent, as well as cure, bed sores (decubitus ulcers). In addition, reducing the pressure and alleviating pressure points that a bed or support surface exerts on a patient's skin can also help prevent, or cure, bed sores. This can be achieved, for example, by providing an inflatable mattress where the weight of a patient can be distributed over a wider area and therefore the pressure on the patient's skin can be greatly reduced, as compared with the pressures exerted by conventional mattresses. The reduced pressure allows greater blood supply to the patient's skin and thus helps to avoid capillary occlusion and the potentially resulting bed sores. Further, even greater pressure relief may be achieved where the mattress contains multiple inflatable cells and where the pressure in each cell, or group of cells, can be independently controlled.

Additional therapies that may be provided to a patient while the patient is in bed, include, for example, those therapies related to treating respiratory complications, such as pulmonary therapy, alternating therapy, pulsation therapy, low air loss therapy, static pressure therapy or the like. Such therapies may require the movement of the patient while in bed for the purpose of loosening up fluids in the patient's lungs. With these therapies, the weight of the patient may be shifted to help loosen up such fluids. Beds or mattresses containing inflatable cells may be used to allow for controlled inflation and deflation of selected cells for the purpose of assisting patient service providers in shifting the weight of the patient.

Fluid-inflatable support products such as mattresses or pads that may be used on or in beds, chairs, or the like to support the weight of a human body may be used to prevent or cure users or patients prone to, or suffering from, decubitus ulcers or pressure sores, such as by distributing the pressure within a plurality of compartments or cells inside the mattress or pad. Fluid-inflatable supports may also be used to help with respiratory complications by loosening fluids in the lungs and removing moisture away from a user's skin to help prevent discomfort such as bed sores, pressure sores, ulcers or other problems. As such, these support products may help prevent skin macerations and high pressure points on a patient's or other user's skin. These applications may rely, for example, on causing rotation or movement of a user or patient or altering the distribution of pressure supporting a user or patient, such as to avoid pressure points or prolonged pressure points. Such alteration in the distribution of pressure may be achieved by differentially inflating the plurality of fluid-filled compartments or cells within the support product. Fluid-inflatable support products may also include attachment structures (e.g., a zipper) to allow the support product to be zipped to a mattress cover or other support surface or cover. Such mattresses may include solid foam mattresses, air cell based mattresses or any other suitable type of mattress.

Existing fluid-inflatable support systems or products have typically relied on manual disconnection of a hose(s) to deflate the support product and provide a flat surface for administering CPR when necessary. Although a variety of connector designs have been made which emphasize fast decoupling of the control unit from the support product, these designs have generally relied on a patient's weight being sufficient to force the fluid out of the interior of the support product, which may delay application of CPR until the patient is firmly on the flat surface. Fluid-inflatable support products or bed systems with a powered CPR function have been constructed which rely on a spring-loaded valve released by a solenoid while other designs have required manual movement of the valve mechanism. For alternating or rotational therapies, existing support systems have traditionally relied on a patient's weight to attain alternating pressure or rotational pressures.

Thus, there is a need in the art for an improved apparatus and method for rapid evacuation of fluid pressure in a fluid bed system for administering CPR to a user or patient and/or providing improved and responsive control or adjustment of pressure distribution in a fluid-filled support or bed system to achieve movement or rotation of a user or patient and/or avoidance of prolonged pressure points on the user or patient, or for any other suitable purpose.

BRIEF DESCRIPTION OF THE DRAWINGS

The accompanying drawings, which are incorporated herein and constitute part of this specification, illustrate exemplary embodiments of the disclosure, and, together with the general description given above and the detailed description given below, serve to explain the features of the disclosure.

DETAILED DESCRIPTION OF THE PREFERRED EMBODIMENT

The present disclosure relates to a fluid-inflatable support system for supporting the weight of a user, such as a human individual. The present disclosure provides a bi-directional valve design that provides for more rapid deflation/evacuation of the support system in addition to inflation. The design of the support system of the present disclosure allows, for example, rapid evacuation of the support system for immediate commencement of cardio-pulmonary resuscitation (CPR) to a user or patient. This is important because of the urgency in administering the CPR procedure, which may require a solid surface. By operation of the valve, the fluid flow generating device may augment the effect of the patient's weight in quickly evacuating the fluid from the support. The present design may further allow for more rapid and responsive fine adjustment or tailoring of pressure, particularly by depressurization or deflation, of one or more cells or compartments of a support system compared to existing devices and systems. Such adjustment of pressure in the one or more cells may be used to quickly adjust the distribution of pressures in the support system in near real time, such as to reduce the amount of time needed to adjust the pressure(s) in the one or more cells of the support system, which may be perhaps in response to changes in the position and/or weight distribution of a user, such as those changes caused by movements of the user.

According to a broad aspect of the present disclosure, a valve device or apparatus is provided that allows for a fluid flowing in one direction through a port of the valve to be reversed by movement of a flow redirecting system. According to embodiments of the present disclosure, the valve device or apparatus may cause reversal in the direction of fluid movement or flow, which may be generated by a fluid flow generating device, through a port of the valve device or apparatus connected to a support system upon actuation of the valve even though the direction of fluid flow emerging from the fluid flow generating device connected to the valve device is unchanged. In other words, the change in direction of fluid flow through the port of the valve device may be achieved according to embodiments of the present disclosure by operation of the valve device or apparatus alone and without any change in the operation of the fluid flow generating device or the direction of fluid flow emerging from the fluid flow generating device.

Figure 1:
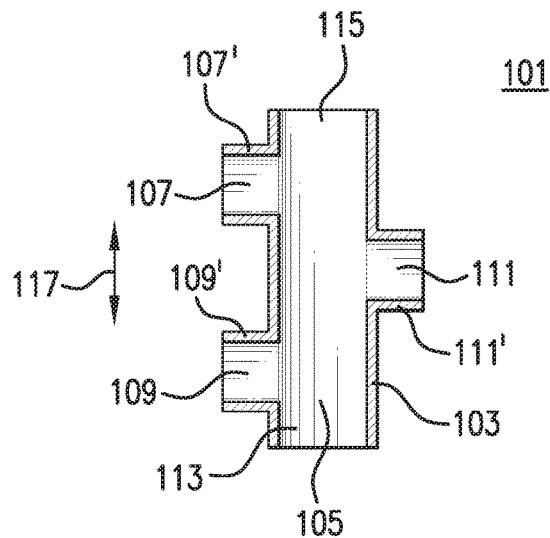
FIG. 1 is a cross-section view of a casing of a valve device embodiment of the present disclosure.

According to embodiments of the present disclosure, a fluid may be pulled into the fluid flow generating device from the environment or atmosphere through the valve device or apparatus or a fluid may exit the valve device or apparatus into the environment or atmosphere depending on the state of operation of the valve device or apparatus. According to some embodiments as shown in FIG. 1, the valve device or apparatus 101 may comprise a casing 103 with a main bore or hole 105, which may be generally straight or linear unlike a "D-valve," and have a lengthwise or longitudinal axis 117 (e.g., from the proximal to the distal end of the bore 105). The casing 103 may, for example, be made of a suitable material(s), such as metal including aluminum, etc., plastic, such as DELRIN®, etc., rubber, etc., and/or have a variety of shapes or proportions including, but not limited to, a generally columnar shape or a block shape. The casing 103 may have a main bore, hole or lumen 105 through the casing 103, and in this example, the bore 105 is cylindrical and extends along a longitudinal axis 117 from one side of the casing 103 to the opposing side of the casing 103, such that there are two ends including a first proximal end 113 and a second distal end 115 which may each be open to the environment or atmosphere surrounding the valve. A force generating device, such as a stepper motor (not shown) may be attached to the proximal end 113 of the casing 103 according to some embodiments, and an outlet or vent (not shown) at or near the proximal end 113 of the casing 103 may provide an opening to the environment. According to embodiments of the present disclosure, the valve device or apparatus may comprise at least three (3) ports including a first port 107 and a second port 109, which may each be connected directly or indirectly to a fluid flow generating device (not shown). In addition, the at least three ports includes a third port 111, which may be connected directly or indirectly to a support system or product, such as a mattress (not shown). Generally, the main bore 105 through casing 103 may be larger in diameter than diameter of each of the three ports 107, 109, 111. For example, the size ratio of the main bore 105 to each of the ports 107, 109, 111 may be approximately 4:3.

According to embodiments of the present disclosure, the first port 107, the second port 109 and the third port 111 may each comprise a hole in the side of the valve device 101 continuous with the main bore 105 of case 103, wherein the hole of each of the ports 107, 109, 111 through casing 103 has an axis along the center of each hole (i.e., a center-line axis) that is at a transverse angle relative to longitudinal axis 117 of the main bore 105 of the valve device 101 (i.e., at an angle of greater than 0 degrees and less than 180 degrees relative to the longitudinal axis 117 of the main bore 105 of the valve device 101 or at approximately 90 degrees or perpendicular relative to the longitudinal axis 117 of the main bore 105 of the valve device 101). Although the first port 107, the second port 109 and the third port 111 are shown as being approximately equally spaced apart in FIG. 1, each of these three ports may have different spacing(s) as will be apparent below as long as the third port 111 is located or disposed between the first port 107 and the second port 109 along the longitudinal axis 117. In other words, the third port 111 is located at an intermediate distance from either the proximal end 113 or the distal end 115 of the casing 105 relative to the first port 107 and the second port 109 (i.e., the third port 111 is located closer to the proximal end 113 and further away from the distal end 115 of the casing 105 relative to the first port 107, and the third port 111 is located further away from the proximal end 113 and closer to the distal end 115 of the casing 105 relative to the second port 109). However, as explained below, the relative positioning of the first port 107, second port 109, and third port 111 may be constrained by the dimensions and relative positions of the first deflecting member and the second deflecting members in different states.

Although the first port 107 and the second port 109 are shown in FIG. 1 as being on the same side of the casing 103 and on the opposing side of the casing 103 as the third port 111, these three ports may each have different positions. Each port 107, 109, 111 may be independently disposed or located at or on any side or radial position relative to the longitudinal axis 117 of the bore 105 along a circumference or periphery of the bore 105 of the casing 103 for a given distance from the proximal end 113 or the distal end 115 as long as the third port 111 is disposed between the first port 107 and the second port 109 along the longitudinal axis 117. Each of the ports 107, 109, 111 may have a lip or flange 107', 109', 111', respectively, projecting outward from the side of the casing 103 to extend each of the respective ports 107, 109, 111, such as for attachment of a conduit or to serve as a hose fitting, which may be connected to a fluid generating device or a support system. Such a lip or flange 107', 109', 111' may be integral to, or separate from, the casing 103. For example, each lip or flange 107', 109', 111' may be separate piece(s) that may be attached to casing 103 and/or inserted into the respective ports 107, 109, 111 of casing 103.

Figure 2A:
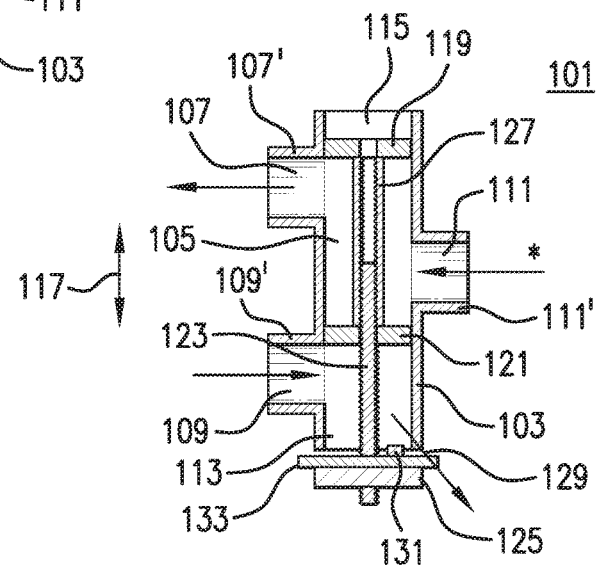
FIG. 2A is a cross-section view of a valve device embodiment of the present disclosure in a first state causing fluid flow into valve through third port.
Figure 2B:
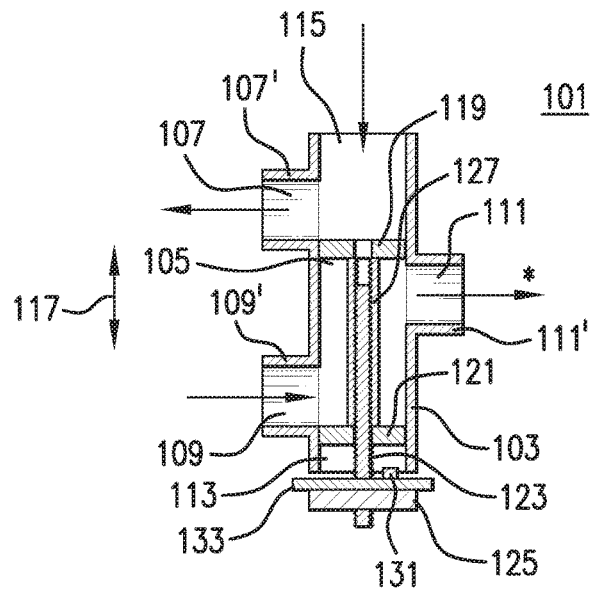
FIG. 2B is a cross-section view of a valve device embodiment of the present disclosure in a second state causing fluid flow out of the valve through third port.

According to embodiments of the present disclosure, FIG. 2 shows a flow redirecting system as part of the valve device or apparatus shown in FIG. 1. The flow redirecting system, such as a spindle valve with a plurality of pistons that move inside the bore 105 in response to control by a motor (425 in FIG. 4) to provide a fluid evacuation mode using the multiple ports as well as a fluid fill mode depending on the location of the pistons with respect to the ports. The spindle valve includes a first deflecting member 119 (e.g., piston) and a second deflecting member 121 (e.g., piston) that may alternate between two states or conditions. By a coordinated movement of the first deflecting member 119 and the second deflecting member 121 generated by the force generating member 125 (e.g., stepper motor), the direction of fluid flow through the third port 111 may be reversed. In a first state shown in FIG. 2A, the first deflecting member 119 is located or disposed between the first port 107 and the distal end 115 of the bore 105 of casing 103 along the longitudinal axis 117, and the second deflecting member 121 is located or disposed between the second port 109 and the third port 111 along the longitudinal axis 117. In a second state shown in FIG. 2B, the first deflecting member 119 is located or disposed between the first port 107 and the third port 111 along the longitudinal axis 117, and the second deflecting member 121 is located or disposed between the second port 109 and the proximal end 113 of the bore 105 of casing 103 along the longitudinal axis 117. Movement of the first deflecting member 119 and the second deflecting member 121 between the first and second states may be achieved by operation of a force generating member 125 with force from the force generating member 125 carried, delivered, conveyed, etc., to the first deflecting member 119 and the second deflecting member 121 by a force conveying member 123. The force generating member 125 such as a stepper motor, may be located at the proximal end 113 of the casing 103. According to some embodiments, the first deflecting member 119 and the second deflecting member 121 may be connected by a connecting member 127, and the first deflecting member 119, the second deflecting member 121 and the connecting member 127 may be integrally formed of a single material, which may together or jointly be referred to as a spindle.

According to embodiments of the present disclosure, FIG. 2A shows a direction of fluid flow (indicated by arrows) through valve device 101 according to a first state with a fluid flow entering or flowing into the valve 101 through the second port 109 and exiting, discharging or flowing out of valve 101 through an outlet, slot or vent 129 and/or the proximal end 113 of valve 101 into the environment. As also shown in FIG. 2A according to the first state, fluid may also simultaneously exit or flow out of valve 101 through the first port 107 to allow or cause fluid to enter or flow into valve 101 through the third port 111 (see arrow with asterisk), such as to deflate or evacuate a support system connected to the third port 111 (not shown). FIG. 2B shows an alternative direction of fluid flow (indicated by arrows) through valve device 101 according to a second state with a fluid flow entering or flowing into the valve device 101 through the distal end 115 and/or near the distal end 115 of valve 101 from the environment and exiting or flowing out of valve 101 through the first port 107. As also shown in FIG. 2B according to the second state, a fluid flow may also simultaneously enter or flow into valve 101 through the second port 109 to allow or cause fluid to exit or flow out of valve 101 through the third port 111 (see arrow with asterisk), such as to inflate a support system connected to the third port 111 (not shown).

As apparent in FIG. 2, to effectively direct the fluid flow through the valve 101, the first deflecting member 119 and the second deflecting member 121 must be fitted into the bore 105 of valve 101 and match the cross-sectional shape of inner surface of bore 105, such that little or no fluid is able to flow between inner surface of bore 105 and the first deflecting member 119 and the second deflecting member 121. Both the cross-sectional shape of inner surface of bore 105 and the shape of the outer radial surfaces or edges of the first deflecting member 119 and the second deflecting member 121 contacting the inner surface of bore 105 may potentially be any matching shape and may be, for example, circular, square, rectangular, etc. According to some embodiments, the first deflecting member 119 and/or the second deflecting member 121 may each have one or more flanges, grooves or other sealing mechanism such as a labyrinth seal, etc., on its outer radial surface between the first deflecting member 119 and/or the second deflecting member 121 and the inner surface of the bore 105 of the valve 101, which may tighten or close any gap between the first deflecting member 119 and/or the second deflecting member 121 and the inner surface of the bore 105 of the valve 101.

According to embodiments of the present disclosure, to effectively direct the fluid flow through the valve 101, there must be (i) sufficient space in bore 105 of valve 101 along longitudinal axis 117 between distal end 115 of valve 101 and first port 107 to accommodate the first deflecting member 119 in a first state, and (ii) sufficient space in bore 105 of valve 101 along longitudinal axis 117 between the first port 107 and the third port 111 to accommodate the first deflecting member 119 in a second state. Likewise, there must be (i) sufficient space in bore 105 of valve 101 along longitudinal axis 117 between the third port 111 and the second port 109 to accommodate the second deflecting member 121 in a first state, and (ii) sufficient space in bore 105 of valve 101 along longitudinal axis 117 between the second port 109 and the proximal end 113 of valve 101 to accommodate the second deflecting member 121 in a second state. According to some embodiments, a sufficient space or distance must take into account the fixed relative positions of, or distances between, the first deflecting member and the second deflecting member (i.e., the center-to-center distance of the two deflecting members). Sufficient space or distance in the bore 105 of valve 101 along longitudinal axis 117 to accommodate the first deflecting member 119 and the second deflecting member 121 may be a space or distance sufficient to allow little or no fluid to flow between inner surface of bore 105 and the first deflecting member 119 and the second deflecting member 121, such as a sufficient space or distance along longitudinal axis 117 that is equal to or greater than the width of the first deflecting member 119 and/or second deflecting member 121 in the longitudinal direction 117.

As is apparent in FIG. 2, the valve device 101 of the present disclosure allows for the direction of fluid flow through the third port 111 of valve 101 to be reversed from entering or flowing inward through the third port 111 (see arrow with asterisk in FIG. 2A) in a first state to exiting or flowing outward through the third port 111 (see arrow with asterisk in FIG. 2B) in a second state, and vice versa, by coordinated movement the first deflecting member 119 and the second deflecting member 121. Such a reversal in the direction of fluid flow through the third port 111 of valve 101 may be achieved even though the directions of fluid flow through the first port 107 and the second port 109 are unchanged between the first and the second states. According to embodiments shown in FIG. 2, a fluid flow generating device (not shown) may have an intake connected directly or indirectly, such as via a conduit, to the first port 107 and an output connected directly or indirectly, such as via a conduit, to the second port 109 with the direction of fluid flow through the first port 107 and the second port 109 unchanged between the first state and second state. However, by changing the position of the first and second deflecting members 119, 121 between the first state and the second state, and vice versa, the direction of fluid flow through the third port 111 may be reversed. Thus, a support system or product, such as a mattress, etc., (not shown) may be connected to the third port 111 directly or indirectly, such as via a conduit, to reversibly inflate and deflate the support system or product without any change in the directions of fluid flow through the first and second ports 107, 109.

Figure 3A:
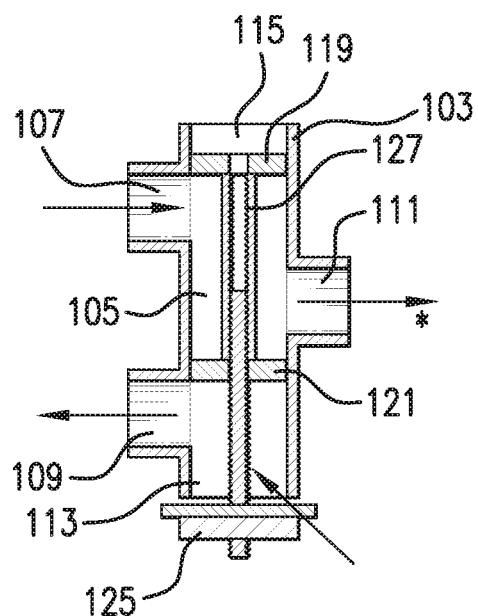
FIG. 3A is a cross-section view of a valve device according to an alternative embodiment of the present disclosure in a first state with the fluid flow through first and second ports reversed relative to FIG. 2 causing fluid flow out of the valve through third port.
Figure 3B:
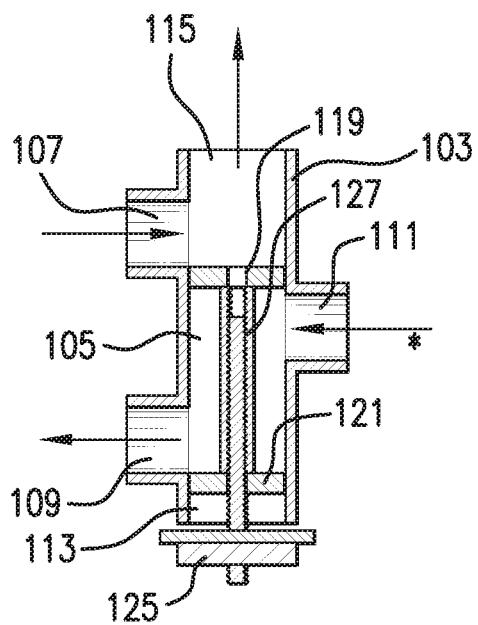
FIG. 3B is a cross-section view of a valve device according to the alternative embodiment in FIG. 3A in a second state with the fluid flow through first and second ports reversed relative to FIG. 2 causing fluid flow into valve through third port.

According to an alternative set of embodiments shown in FIG. 3, the direction of fluid flow through the first port 107 and the second port 109 may be reversed relative to embodiments shown in FIG. 2 with a reciprocal fluid flow through the third port 111 that may be reversed between a first state and a second state. According to these embodiments, FIG. 3A shows a direction of fluid flow (indicated by arrows) through valve device 101 according to a first state with a fluid flow entering the valve 101 through the outlet or vent 129 and/or proximal end 113 of valve 101 and exiting valve 101 through the second port 109 of valve 101. As also shown in FIG. 3A according to the first state, fluid flow may also simultaneously enter or flow into valve 101 through first port 107 to allow or cause fluid to exit or flow out of valve 101 through the third port 111 (see arrow with asterisk). FIG. 3B shows an alternative direction of fluid flow (indicated by arrows) through valve device 101 according to a second state with a fluid flow entering the valve 101 through the first port 107 of valve 101 and exiting valve 101 through the distal end 115 or near distal end 115 of valve 101. As also shown in FIG. 3B according to the second state, fluid flow may also simultaneously exit or flow out of valve 101 through second port 109 to allow or cause fluid to enter or flow into valve 101 through the third port 111 (see arrow with asterisk).

Figure 4A:
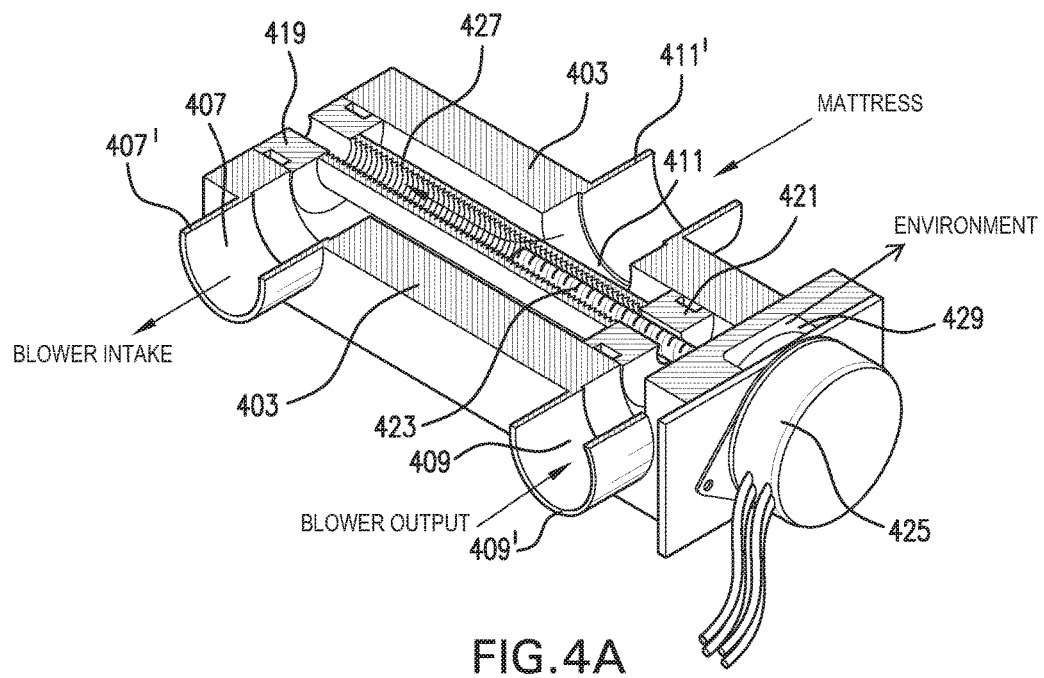
FIG. 4A is a perspective cross-section view of a valve device embodiment of the present disclosure in a first state.
Figure 4B:
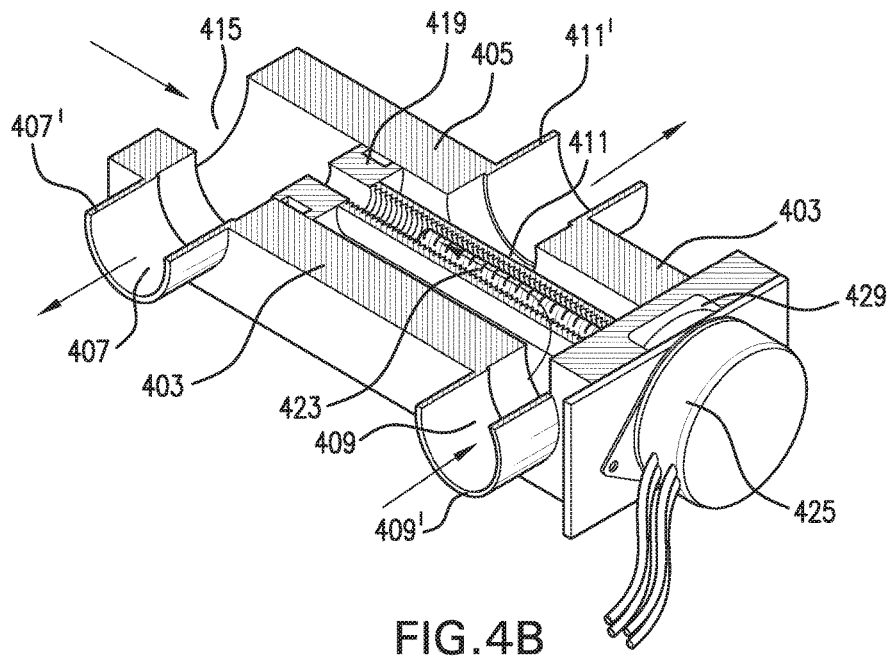
FIG. 4B is a perspective cross-section view of a valve device embodiment of the present disclosure in a second state.

FIG. 4 depicts a perspective view of the valve device of the present disclosure according to some embodiments. FIG. 4A depicts a valve device 401 in a first state with fluid entering or flowing into the third port 411 and exiting or flowing out of valve 401 through the first port 407. FIG. 4A further depicts the first state with fluid entering or flowing into the second port 409 of valve 401 and exiting for flowing out of vent 429 and/or proximal end of valve 401. FIG. 4B depicts a valve device 401 in a second state with fluid exiting or flowing out of the third port 411 and entering or flowing into valve 401 through the second port 409. FIG. 4B further depicts the second state with fluid entering or flowing into the distal end 415 of valve 401 and exiting for flowing out of the first port 407 of valve 401.

Figure 5A:
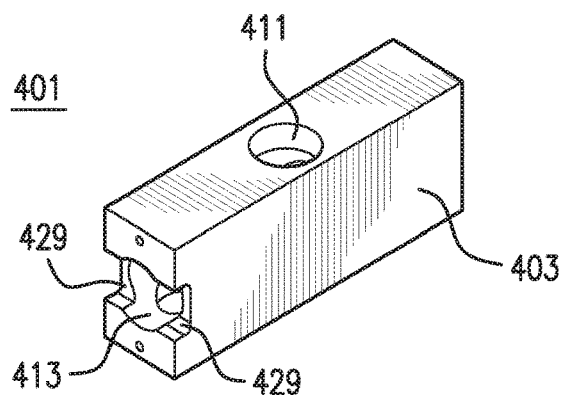
FIG. 5A is a perspective view of a casing of a valve device embodiment of the present disclosure.
Figure 5B:
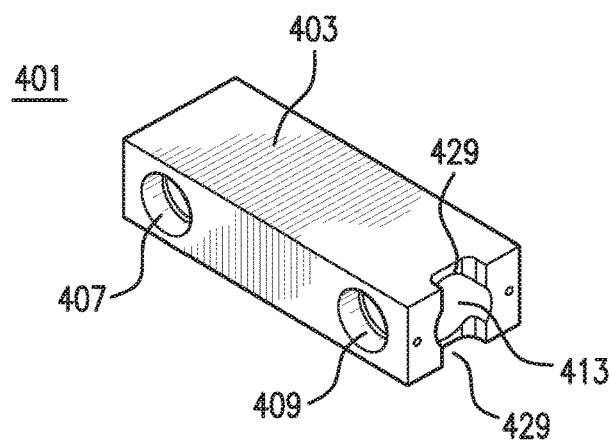
FIG. 5B is an alternative perspective view of the casing shown in FIG. 5A.
Figure 6:
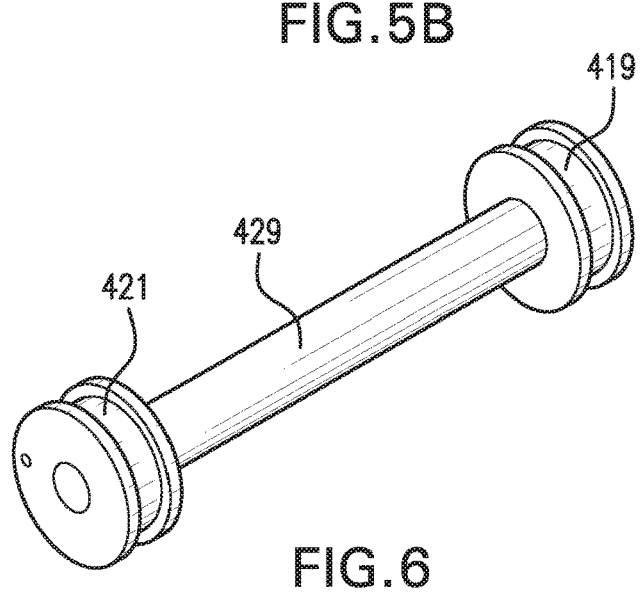
FIG. 6 is a perspective view of a deflecting members connected by a connecting member which may be referred to as a spindle.

Valve device 401 according to some embodiments such as depicted in FIG. 4 may have flanges 407', 409', 411' inserted into the first port 407, the second port 409, and third port 411, respectively, to extend them. FIG. 5 depicts embodiments of valve 401 in FIG. 4 without the flow redirecting system and flanges 407', 409', 411'. FIG. 5A shows a perspective view of the casing 403 of valve 401 with third port 411 shown facing upward and proximal end 413 of casing 403 having an opening with vents 429. FIG. 5B shows a perspective view of the casing 403 of valve 401 with first port 407 and second port 409 shown facing to the left and proximal end 413 of casing 403 having a discharge port 429. Deflecting member 421 is moved to plug or unplug the discharge port 429 depending on the operational mode of the system. In the embodiments shown in FIGS. 5A and 5B, two vents are provided on opposing sides of casing 403 at proximal end 413. FIG. 6 shows a depiction of first deflecting member 419 and second deflecting member 421 with connecting member 427, which may together be referred to as a spindle.

Figure 7A:
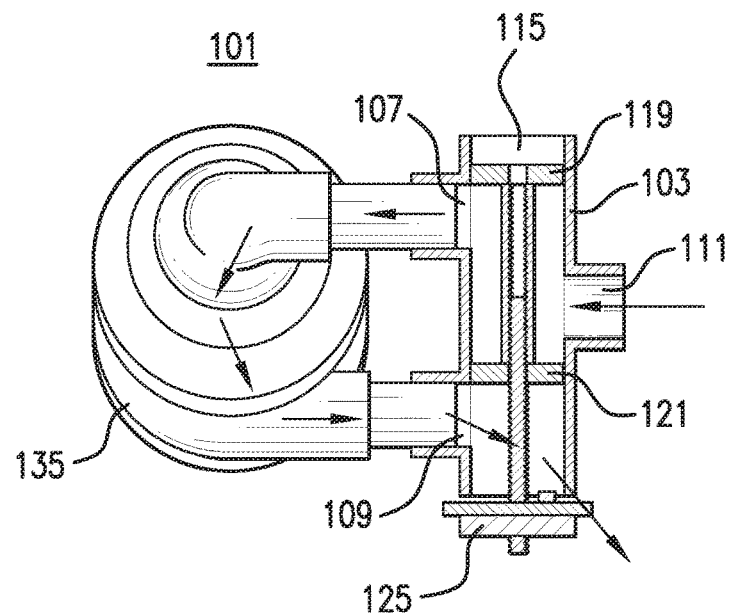
FIG. 7A is a cross-section view of a valve device in a first state similar to the valve device of FIG. 2A showing a fluid flow generating member or blower attached to the first and second ports of the valve device.
Figure 7B:
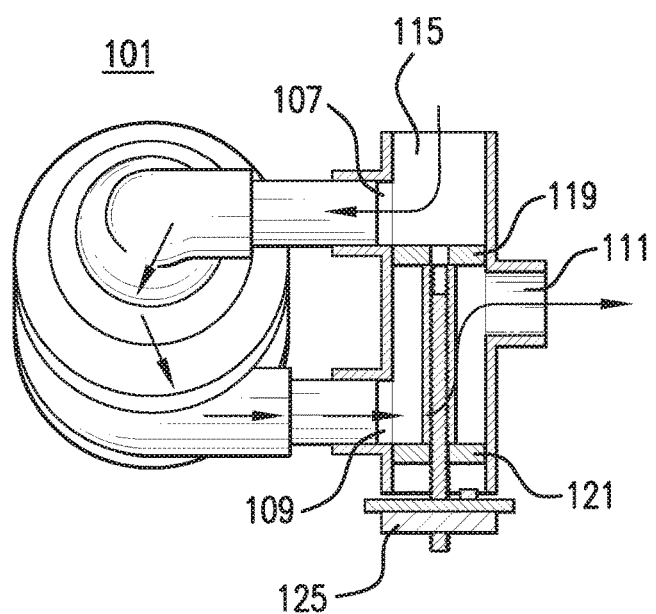
FIG. 7B is a cross-section view of a valve device of FIG. 7A in a second state showing a fluid flow generating member or blower attached to the first and second ports of the valve device.
Figure 8A:
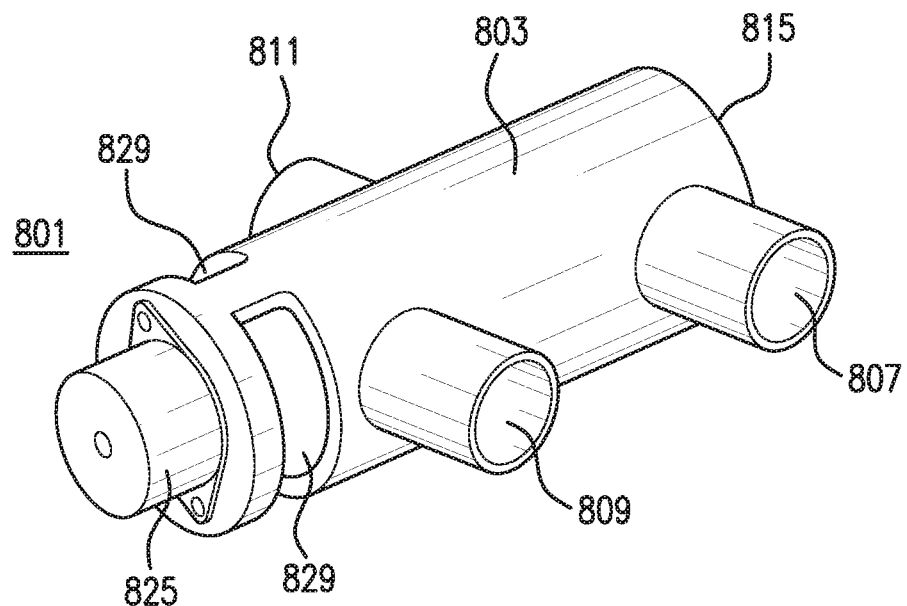
FIG. 8A is a perspective view of a valve device of the present disclosure.
Figure 8B:
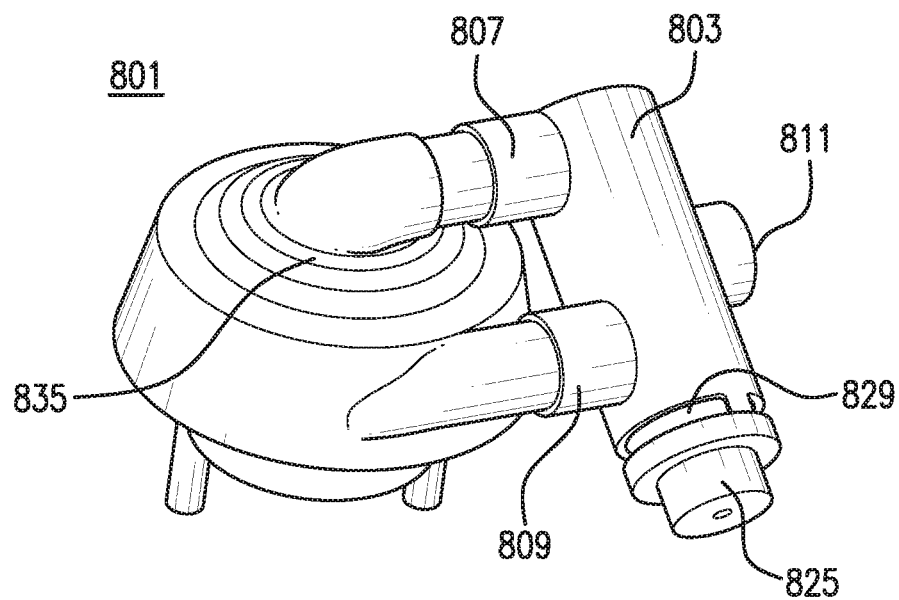
FIG. 8B is a perspective view of a valve device of the present disclosure in association with a fluid flow generating device.

FIG. 7 shows an embodiment of the present disclosure corresponding to the valve shown in FIGS. 1, 2 and 4 with a fluid flow generating device 135 further provided for generating or powering the fluid flow through the first port 107 and second port 409. Based on whether the flow redirecting system comprising a first deflecting member 119 and a second deflecting member 121 is in a first state (deflecting members further away from force generating member) or a second state (deflecting members closer to force generating member), the fluid flow generated by the fluid flow generating device may either drive fluid flow into valve 101 or out of valve 101, respectively, through the third port 111. According to the embodiment shown in FIG. 7, the fluid flow generating device may be a blower device. FIG. 8 shows a full perspective view of valve device according to embodiments of the present disclosure corresponding to valve device 101 depicted in cross-section in FIGS. 1, 2 and 4. Valve device 801 is shown in FIG. 8A with casing 803 having first port 807, second port 809 and third port 811 as well as vent 829 and force generating member 825 on proximal end 813 opposing distal end 815 of casing 803. Valve device 801 shown in FIG. 8A is also shown in FIG. 8B with fluid flow generating device 835, such as a blower, with an intake and output or outflow attached or connected to first and second ports 807, 809.

According to embodiments of the present disclosure, a fluid flow generating device may be any device that is able to produce a fluid flow in one direction out or through an outlet, outflow or output of the device and an opposite fluid flow direction in or through an intake, inlet, inflow or input of the device. For example, the fluid flow generating device may be a pump, such as a blower, fan, or any suitable fluid source. According to embodiments of the present disclosure, the input and output of the fluid flow generating device may each be connected either directly or indirectly, such as via a conduit, to a valve device of the present disclosure. The direction of fluid flow through the fluid flow generating device will generally remain unchanged regardless of the operation of the valve device with fluid flowing or entering into the input of the fluid flow generating device and fluid flowing or exiting out of the output of the fluid flow generating device.

According to embodiments of the present disclosure, the first deflecting member and the second deflecting member of the flow redirecting system, which may comprise a double-ended piston or spindle, may be moved between a first state and a second state by a force generating member with forces conveyed, communicated, imparted, etc., from the force generating member to the first and second deflecting members via a force conveying member. According to embodiments of the present disclosure, the force generating member and the force conveying member may together include any actuator, device or mechanism known in the art that is able to cause linear or axial movement, such as linear or axial movement of the first and second deflecting members to move from a first state to a second state, and vice versa, with the first and second states corresponding to different positions of the first and second deflecting members. According to some embodiments, the force generating member may include a motor, such as a stepped motor, etc., or other device based on a rotating crank or cam-type mechanism, hydraulic- or fluid-driven mechanism, magnetic solenoid-type mechanism, or any suitable mechanism, to cause movement of the first and second deflecting members. According to embodiments using a motor, such as a stepper motor, as a force generating member, the motor may be mounted or attached to the proximal end of a valve device of the present disclosure, such as to a cover plate mounted or attached to the proximal end of a valve device. A home switch or a limit switch may also be mounted or attached to the cover plate to detect when the closest deflecting member is close to or nearing the motor. Such a limit switch may signal for the movement of the deflecting members to cease or stop. From a stopped position, the first and second deflecting members may be moved from a first state to a second state, or vice versa, via a specific amount of movement of the force generating member, such as by a specific number of rotations of the motor.

According to some embodiments of the present disclosure, however, the first deflecting member and the second deflecting member of the flow redirecting system, which may comprise a double-ended piston or spindle, may instead be moved manually between a first state and a second state with forces conveyed, communicated, imparted, etc., to the first and second deflecting members via a force conveying member. According to these embodiments, an individual or user may be actuated or driven by any manual actuator, device or mechanism known in the art that is able to cause linear or axial movement, such as linear or axial movement of the first and second deflecting members to move from a first state to a second state, and vice versa, with the first and second states corresponding to different positions of the first and second deflecting members. For example, the manual device may be operated by using a knob, lever or slide which may be rotated or pushed to achieve the bi-directional actuation of the valve in regards to fluid flow through the third port of the valve.

According to some embodiments, translational movement may be communicated, conveyed, imparted, etc., to the first and second deflecting members from the force generating member via a force conveying member. For example, the force conveying member may include a screw-threaded shaft that engages a corresponding internal screw-threaded hole through the first and second deflecting members with translational, as opposed to rotational, movement imparted to the first and second deflecting members via an anti-rotation feature. A connecting member between and connecting the first and second deflecting members may also be provided with the connecting member further providing a screw-threaded hole for engaging the screw threaded shaft. The anti-rotation feature may include any mechanism known in the art to constrain rotational movement and encourage translation movement of the first and second deflecting members. For example, the anti-rotation feature may be a friction-causing feature, s between the outer surface of the first and second deflecting members and the inner surface of the bore of the valve. The anti-rotation feature may also include, for example, any other rotational movement-constraining feature, such as a projection or rod and corresponding linear or nearly linear groove interface between the inner surface of the bore and the outer surface of the first and second deflecting members.

Figure 9A:
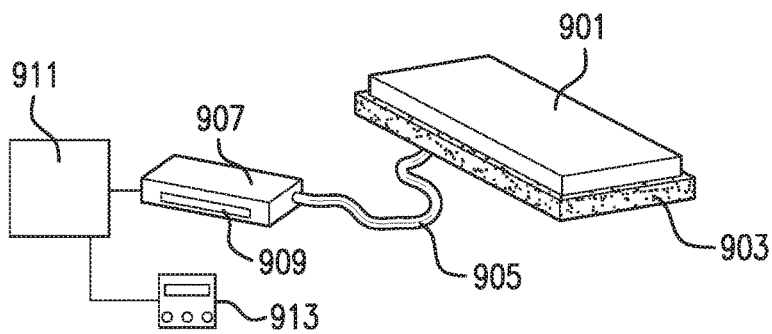
FIG. 9A is an illustration of the valve device in a housing with controller and user interface and attached to a support.

According to embodiments of the present disclosure, the third port of valve may be connected directly or indirectly, such as via a conduit, to a fluid-inflatable support, such as a pad or mattress, to support the weight of a user, individual or patient. However the valve may coupled to any suitable structure. Mattresses that may be used as a support of the present disclosure may include solid foam mattresses, air cell based mattresses or any other suitable type of mattress. Depending on the state of the valve (i.e., positioning of first and second deflecting members), the support may be inflated or deflated, such as to adjust, inflate, deflate, evacuate, etc., the fluid pressure in the support. As shown in FIG. 9A, a fluid-inflatable support product 901, such as a mattress, which may be disposed on top of a frame 903 such as a bed frame, may be connected to a third port of the valve device of the present disclosure, such as via a conduit 905. The valve device, fluid flow generating device, and/or other components (not shown) may be disposed and/or mounted inside a housing 907. Housing 907 may further include an opening 909 to allow fluid or air to pass in and out of the housing 907. An electronic controller 911, which may include hardware and/or software portions, may also be in the housing 907 or provide control information to the valve and fluid flow generating device. The controller 911 may coordinate the various aspects or components of the present disclosure, such as the state of the valve device, the operation and speed of the fluid flow generating device, etc. A user interface 913 may also be connected to controller 911 to allow a user or individual to send commands to the controller 911 and/or components inside housing. The user interface 913 may also receive information from the controller 911 as well as components inside housing and/or the support 901 about the status of various aspects and state of operation of the system or apparatus, which a user or individual may use in deciding on commands to enter into the user interface 913. According to some embodiments, the user interface 913 and controller 911 may be disposed and/or mounted in the same unit (not shown) which may be a separate unit from the housing or internal to the housing. Alternatively, the user interface may be disposed or located on a separate unit or terminal from the housing and/or valve device.

Figure 9B:
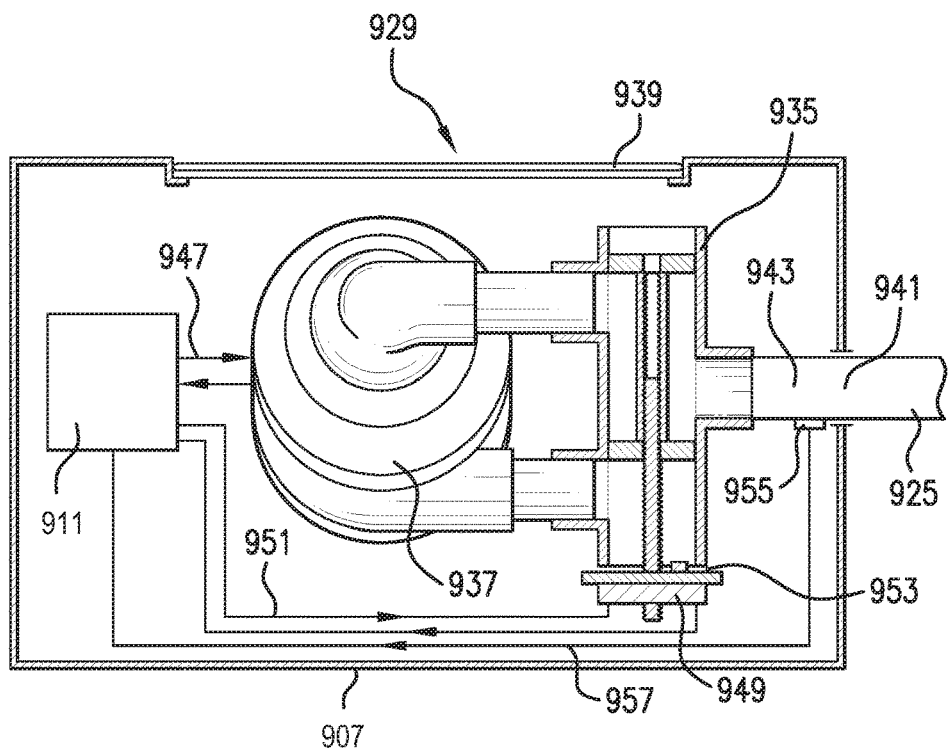
FIG. 9B is a cut-away view of a housing enclosing the valve device with fluid flow generating device and controller.

According to embodiments of the present disclosure, the reversible fluid flow valve device of the present disclosure may be disposed and/or mounted inside a housing. The housing must be large enough to contain, accommodate and/or enclose at least the valve device within its interior, but the housing may have a variety of shapes and dimensions. The housing may further contain, accommodate and/or enclose a fluid flow generating device for use in combination with the valve device (i.e., connected directly or indirectly to the first and second ports of the valve). Depending on the state of the valve inside the housing, fluid may need to enter the valve from its environment and/or fluid may need to exit the valve into the environment. Therefore, the housing may further provide one or more openings (see, e.g., 909 in FIG. 9A) to allow a fluid to enter and/or exit the housing based on the state of the valve. The one or more openings may have a variety of shapes and dimensions and may be located in a variety of locations on the housing. The one or more openings may be further associated with a filter, such as a filter having an open cell or foam material. As shown in FIG. 9B according to some embodiments, the valve device 935 and fluid flow generating device 937, such as a blower, etc., may be disposed and/or mounted inside housing 927. An opening 929 in side of housing 927 is also shown with a filter 939 associated therewith. Due to the reversible direction of fluid flow, the operation of the valve device of the present disclosure may have the additional advantage of self-cleaning the one or more openings and/or associated filter in the housing by operation of the valve device and fluid flow generating device, such as by blowing out dust and other material that may otherwise accumulate without the reversible fluid flow.

As shown in FIG. 9B, the housing may further include one or more external ports 941 in or through a side of the housing 907, which may each be associated with a fitting, etc., for the attachment or connection of one or more external conduits 925. The one or more external conduits 925 may be connected and/or attached to the exterior side of the one or more external ports 941 with the opposing end(s) of the one or more external conduits attached and/or connected to the support (not shown), such as to one or more cells or compartments of the support. On the interior side of the housing 927, the one or more external ports 941 in housing 927 may be attached and/or connected directly or indirectly to the third port of the valve device 935. According to some embodiments, one or more internal conduits 943 may be attached and/or connected to the interior side of the one or more external ports 941 with the opposing end(s) of the one or more internal conduits 943 attached and/or connected to the third port of the valve device 935. The valve device 935 may be further connected directly or indirectly to a fluid flow generating device 937 via its first and second ports, and the fluid flow generating device 937 may also be disposed and/or mounted inside the housing 927. The valve device in FIG. 9B is shown in a first state to deflate or evacuate the support (not shown). However, the valve may alternatively be in a second state to inflate or fill the support.

According to some embodiments, an electronic controller 911 as shown in FIG. 9B may also be disposed and/or mounted inside housing 907 for controlling the operation of the various components of the system in the housing 907 or elsewhere and receiving operational and status information or feedback. The controller 945 may control the operation of the fluid flow generating device 937 via any suitable interface shown as first electronic communication line 947. The controller 945 may control the operation of the force generating member 949, such as a motor, etc., of valve device 935, such as to control the movement of spindle of valve device 935 via line 951. The controller 945 may also receive information from force generating member 949 via the second electronic communication line 951, such as from the limit switch 953 of force generating member 949. Controller 945 may receive information from fluid pressure sensor 955 regarding the fluid pressure inside internal conduit 943 via a third electronic communication line 957. Alternatively, controller may receive fluid pressure information via electronic communication line(s) from anywhere else and from one or more points in the system, such as from within the valve device, external port(s), external conduit(s), support or one or more cells of support, etc. Electronic control lines may be any means known in the art for communicating electronic or digital information or signals, such as wiring, etc.

Figure 9C:
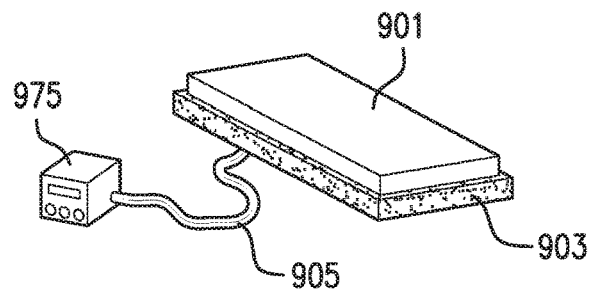
FIG. 9C is a an illustration of the valve device in a portable housing attached to a support.

According to some embodiments, housing may also contain and/or enclose a user interface in addition to the controller and other components, such as the valve device, fluid flow generating device, etc. (not shown). According to these embodiments, housing may comprise a complete portable unit with a user interface, controller and other components contained and/or enclosed within the housing. For example, as shown in FIG. 9C, a portable unit 975 comprising a user interface and internal components including a controller, valve device, fluid flow generating device, etc., for connection to a mattress or support 901 may be provided. The ability to rapidly evacuate fluid pressure from the support may also have a benefit for portability, transport and storage. The support surfaces, such as mattresses, etc., may often be rolled-up for transportation and storage. Therefore, the time and effort required to purge the fluid from the support may be greatly reduced. This feature may be very helpful for Durable Medical Equipment (DME) dealers who primarily rent support surfaces for quick setup and need to dismantle the support surfaces for relocation.

Figure 10:
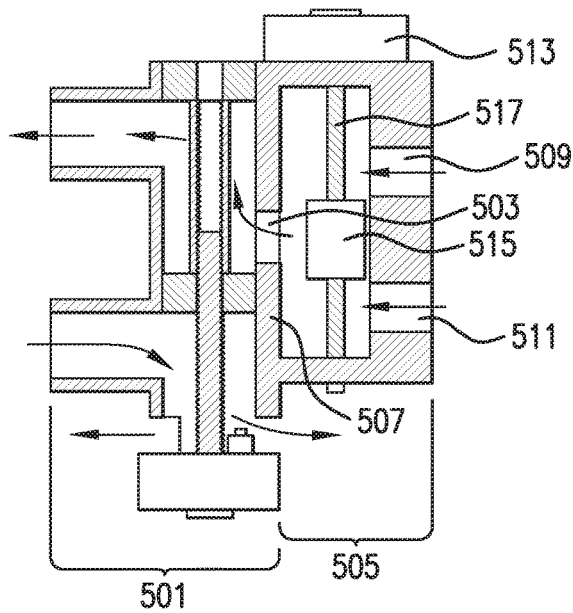
FIG. 10 is a cross-section view of a valve device associated with an A/P valve.

According to some embodiments, the fluid-inflatable support, such as a mattress or pad, may comprise a plurality of cells or compartments, in which the fluid pressure may be separately or individually adjusted, inflated, deflated, evacuated, etc. The fluid pressure in each of the plurality of cells or compartments may be separately or individually adjusted, inflated, deflated, evacuated, etc., by joint operation of the valve device of the present disclosure for reversing fluid flow in combination with additional valve device(s) having multiple input/output ports connected directly or indirectly to the each of the plurality of cells or compartments of the support. As shown in FIG. 10, for example, a reversible fluid flow valve device 501 (as described herein) of the present disclosure may be combined, connected, attached, formed, etc., with an alternating pressure (A/P valve) 505. The reversible fluid flow valve device 501 and A/P valve 505 may share a common wall 507 with reversible fluid flow device, which may be integrally formed with reversible fluid flow device. Thus, reversible fluid flow valve device 501 and A/P valve 505 may be integrally formed or may be coupled through tubing or other structure. A/P valve 505, as know in the art, may comprise a motor 513 to power the movement of a blocking object 515, which may be carried, delivered, conveyed, etc., to the blocking object 515 via a screw threaded rod 517. Movement of the blocking object 515 may be used to alternatively block the fluid pressure through a fourth external port 509 or a fifth external port 511 of A/P valve 505, which may each be directly or indirectly attached, connected, etc., to two separate zones, cells or sets of cells. A/P valve 505 may have an internal port 503 that is continuous with third port 503 of valve device 501, which may be formed as a common port 503 of common wall 507.

According to some embodiments, the alternating pressure (A/P valve) may allow two zones, cells or sets of cells of the support to be separately controlled by inflation, deflation, evacuation, etc. For example, a series of parallel cells or compartments of the support each having an elongated shape may be arranged or stacked in the major plane of the support in either the length or width direction. The individual cells or compartments of the support may be numbered sequentially from one end to another such that high and low pressure states alternate with one or more cells, such as odd-numbered cells, having a higher pressure when the other cells, such as even-numbered cells, have a lower pressure, or vice versa. This application may be used to relieve pressure points and bed sores by allowing for the pressure to be relieved in one or more locations while applying pressure in other locations to support the weight of the user, and then to alternate or modify the pressure distribution by raising the pressure in the cells having a lower pressure to the support the user and lowering the pressure in those having a higher pressure to provide relief from the pressure of the support. By cycling the fluid pressure in this way, bodily tissues of a user or patient may be relieved of pressure to allow perfusion of those tissues (i.e., process of nutritive delivery of arterial blood to a capillary bed in those tissues). During one-half of an alternating pressure cycle the pressure may be increased in a certain portion(s) of the support surface, and during the other half of the cycle, the pressure may be rapidly reduced using the reversible valve of the present disclosure. This type of application may also be used to alternate between two fluid pressure distribution states, such as by cycling between a left and right pressure states, to help loosen fluids in lungs of a user or patient by shifting their weight. These therapies may be used to treat respiratory complications such as pulmonary therapy, alternating therapy, pulsation therapy, low fluid loss therapy, static pressure therapy or the like. Each of these processes or therapies may be performed in a variety of ways and may be repeated any number of times. In FIG. 10, blocking object 515 may quickly, slowly, abruptly, etc., move from being in front of fourth port 509 and fifth port 511, and thus block the applied fluid pressure to the respective zones, cells or sets of cells.

Figure 11:
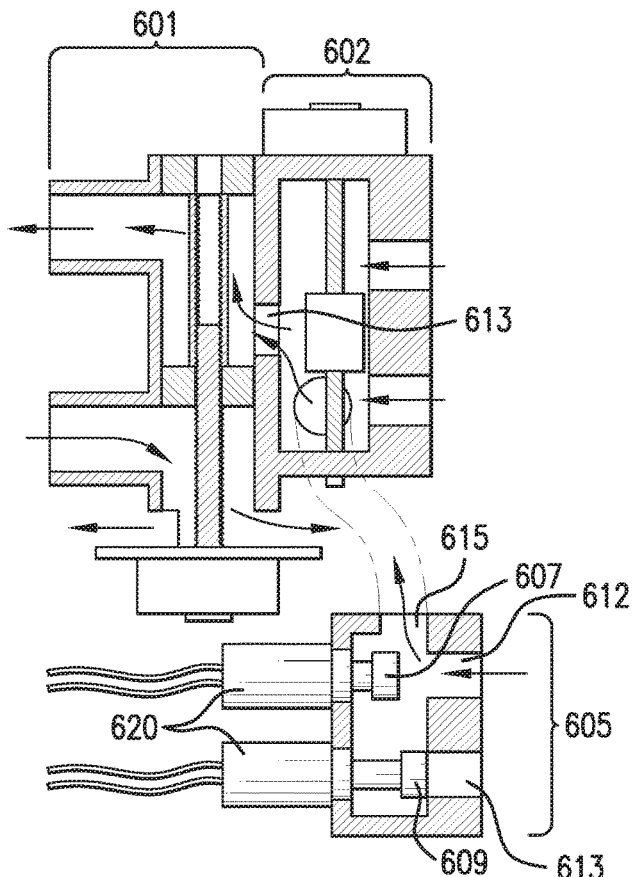
FIG. 11 is a cross-section view of the a valve device associated with an A/P valve and a bolster valve.

According to some embodiments, a reversible fluid flow valve device (as described herein) of the present disclosure may be combined, connected, attached, formed, etc., with or to a solenoid-type valve or a bolster valve. As shown in FIG. 11, a bolster valve 605 having two separately operated and controlled pistons 607, 609 may each be retracted away from a respective ports 611, 613, respectively, to allow fluid flow through the respective port, or pistons 607, 609 may each be extended to engage the respective ports 611, 613, respectively, to block fluid flow through the respective port. At any given time, pistons 607, 609 may both be extended and engaged, both retracted, or one extended and the other retracted. Movement of pistons 607, 609 may be individually powered or generated by movement devices 620. An internal port 615 of bolster valve 605 may be connected directly or indirectly, such as via a conduit and/or through additional valve(s), to the third port 613 of reversible fluid flow valve device 601. In the embodiment shown in FIG. 11, internal port 615 of bolster valve 605 may be connected to the internal chamber of A/P valve 602, such as via a conduit. According to some embodiments, operation of the bolster valve 605 may be used to separately and independently direct a fluid pressure to different compartments or cells of a support connected directly or indirectly to the ports 612, 613 of bolster valve 605. For example, extension of one piston and retraction of the other may be used to deflate one side of a support while the other remains inflated to tilt the support, such as to rotate or turn a user or patient lying on top of support, which may be used to reposition the patient for administering a treatment to the patient in bed or to transfer the patient to another support surface. According to another embodiment, bolster valve may be used to direct a fluid pressure to one of the sides or bumpers located near the periphery of support to keep a user or patient from rolling off support.

Figure 12:
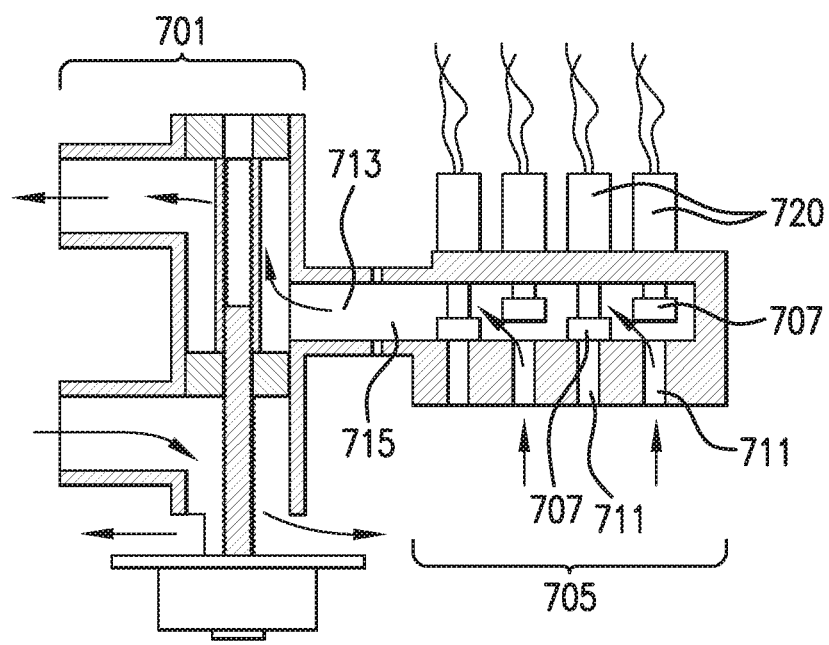
FIG. 12 is a cross-section view of the a valve device associated with a multi-solenoid valve manifold.

According to some embodiments, a solenoid valve based on a similar concept as the bolster valve may be used to multiplex the application of the fluid pressure from the reversible fluid flow valve device (as described herein) to a plurality of cells or compartments of a support. As shown in FIG. 12, a solenoid valve 705 having a plurality of separately operated and controlled pistons 707 may each be retracted away from a respective port 711 to allow fluid flow through the respective port, or pistons 707 may each be extended to engage the respective port to block fluid flow through the respective port. At any given time, each of the pistons 707 may be extended and engaged or retracted in any combination. Movement of pistons 707 may be individually powered or generated by movement devices 720. An internal port 715 of solenoid valve 705 may be connected directly or indirectly, such as via a conduit and/or through additional valve(s), to the third port 713 of a reversible fluid flow valve device 701. According to some embodiments, operation of the solenoid valve 705 may be used to separately and independently direct a fluid pressure to a larger number of different compartments or cells of a support connected or attached directly or indirectly, such as via a conduit, to each of the respective ports 711 of solenoid valve 705. For example, separate and independent extension or retraction of individual pistons may be used to inflate, deflate, evacuate, etc., individual cells or compartments of support to alter, modify, change, adjust, etc., the distribution of fluid pressures in the support such as within the major plane of the support. According to these embodiments, solenoid valve may be used to individually control the fluid pressure in the individual cells or compartment of the support, such as to reduce pressure points and/or maintain "zero interface pressures" under a patient or user. To prevent and heal bedsores with a support surface, a balance must be struck between having enough fluid pressure in the support to support the weight of a user or patient and/or keep the user off of a harder surface of the bed that may be underneath the support while not having so much pressure that the fluid support surface itself becomes too firm. The key advantage of using the reversible valve of the present disclosure is that it can be used to ensure that the low pressure fluid cells in the support surface are rapidly evacuated to quickly achieve even interface pressures under the patient quickly (e.g., in seconds), such as in response to movement or weight shift of the patient.

As described above, movement of the deflecting members of the valve device of the present disclosure may be either manually controlled or driven by a force generating member, such as a motor. In those embodiments wherein the movement of the deflecting members of the valve device is driven by a force generating member, the operation of the force generating member may either be controlled by an individual or user via an electronic controller. The force generating member may be controlled automatically, and such automatic control may be based on information from one or more sensors for detecting pressure, etc., within the valve or associated components of the apparatus/system and/or the status of the deflecting members (i.e., their positioning, state, etc.). Whether the force generating member is operated automatically or via a command from a user, such operation of the force generating member may be controlled by a controller. The controller may also simultaneously and/or coordinately control the operation of the fluid flow generating device. Even in those circumstances where the deflecting members are moved or actuated manually, operation of the fluid flow generating device and/or other components may be coordinated or operated by a controller.

According to some embodiments, the user interface may include a display and/or push buttons, keys or switches for providing and receiving commands to/from an individual or user. For example, a user may actuate a CPR mode by entering the command into the user interface, and the controller may coordinate (1) the movement of the deflecting members from a normal flow state to a CPR state or mode to reverse the direction of fluid flow through the third port of the valve device, and (2) the operation of the fluid flow generating device to evacuate the fluid out of a support. The movement of the deflecting members may be controlled by the controller causing the force generating member to rotate a specific number of times to translationally move the deflecting members a predetermined or defined distance between the two states. The controller may also encourage the rapid evacuation of the support to transition to the CPR state by simultaneously causing the fluid flow generating device to run at maximum speed for a pre-determined period of time or until a command is manually given. Whether operated manually, electronically and/or automatically, the valve device may be reset to a normal or inflating state once the fluid is mostly or completely removed.

Figure 13:
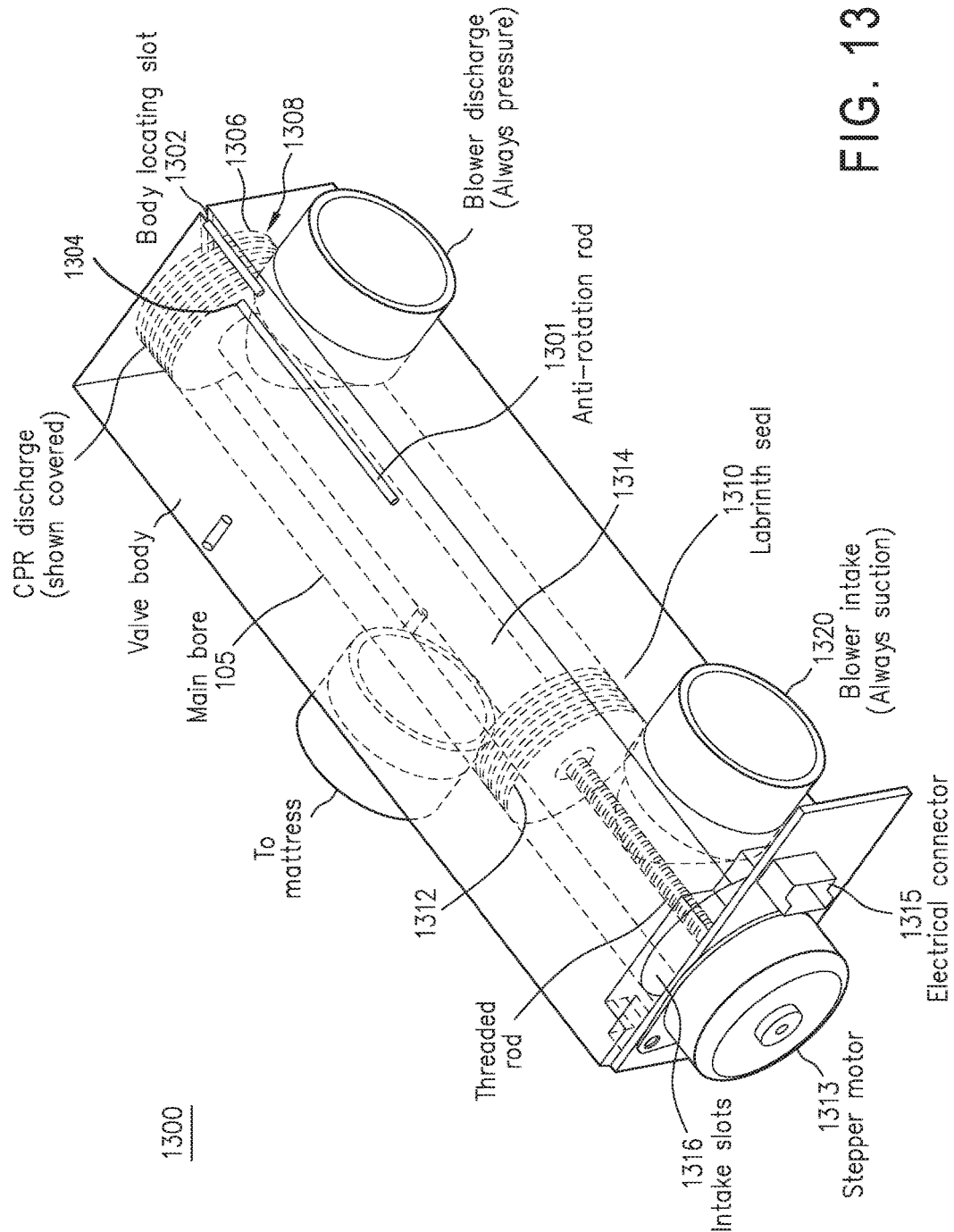
FIG. 13 illustrates one example of a valve in accordance with another example set forth in the disclosure.
Figure 15:
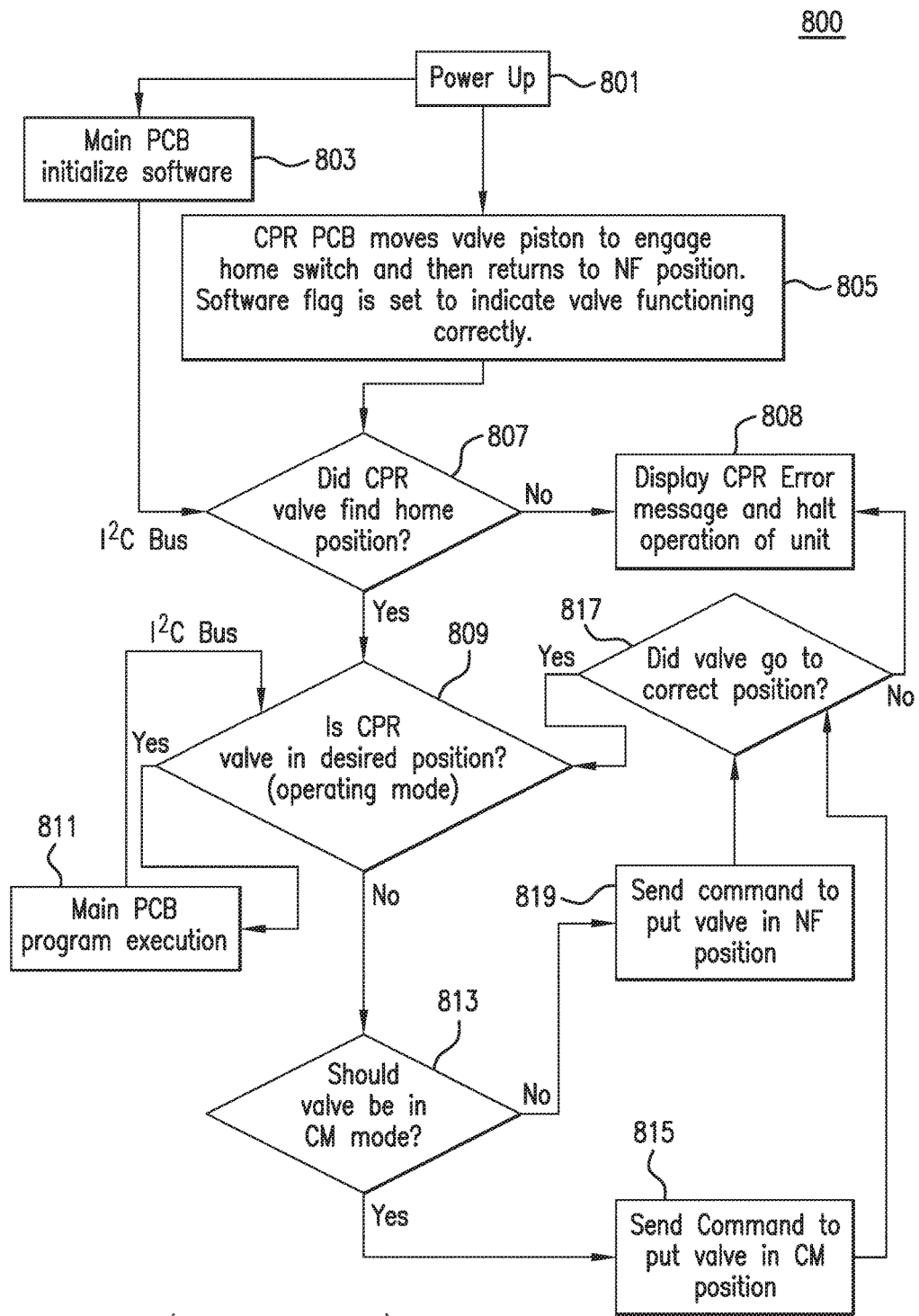
FIG. 15 is a flow chart showing the operational steps for the valve device according to an embodiment of the present disclosure for switching from a normal flow to a CPR mode.

Referring to FIG. 15, according to another broad aspect of the present disclosure, methods are also provided for the operation of the valve device of the present disclosure. A method embodiment 800 of the present disclosure is shown in FIG. 13 for switching from (1) a normal flow (NF) state for inflating or maintaining inflation of a support to (2) a CPR mode (CM) for decreasing fluid pressure or evacuating a fluid from the support to administer CPR. The controller in these embodiments may include any suitable control logic such as but not limited to one or more suitably programmed processor with associated memory, discrete logic such as state machines, ASIC, or any suitable combination of hardware and software. According to this method, a unit, which may comprise a reversible fluid flow valve device, fluid flow generating device, controller, and/or additional components described herein, may be first powered up 801. The power up step leads to two branched steps in parallel: (1) the Main PCB of the controller may initialize software 803 via an I$^2$C Bus; and (2) the CPR PCB of the controller may direct 805 the movement of the deflecting members of valve such that the second deflecting member engages a home switch to reset its positioning and then return the deflecting members to a NF position. The Main PCB will then query 807 whether the CPR valve found the home position. If the answer to query 807 is "no," then the unit or user interface of device will display an error 808. If the answer to query 807 is "yes," then the Main PCB switches to an operating mode and queries 809 whether the deflecting members of valve are in the desired position. If the answer to query 809 is "yes," then the Main PCB loops through a program execution step 811 via an I$^2$C Bus to repeat query 809. If the answer to query 809 is "no," then the Main PCB will query 813 whether the valve should be in CPR mode. If the answer to query 813 is "yes," then the Main PCB sends a command 815 to valve to cause movement of positioning of deflecting members to place valve in CPR mode (i.e., to reverse the direction of fluid flow through a third port of valve connected to a support to evacuate fluid pressure from support). After step 815, the Main PCB then queries 817 whether the valve moved the deflecting members to the correct positioning. If the answer to query 813 is "no," then the Main PCB sends a command 819 to valve to cause movement of positioning of deflecting members to place valve in NF mode.

Stated another way, FIG. 15 illustrates a method for electronically evacuating fluid from or adding fluid to a fluid inflatable support. The method includes determining, such as by the controller, an operating mode to supply fluid to the inflatable support or to evacuate air from the inflatable support such as by receiving an indication from a mode button on a user interface. If the mode is a fluid evacuation mode, controlling a valve device that includes a plurality of ports and a spindle valve to move the spindle valve in a fluid evacuation position. The method includes determining if the spindle valve moved to a correct position based on information from a spindle valve position sensor. If desired, the method includes controlling a fluid flow generating device to receive the evacuated fluid from the fluid inflatable support.

FIG. 13 illustrates another example of the valve 101 which in this case includes an anti-rotation rod 1301 that is in the shape of a "J" that is inserted into body locating slot 1302 as well as through an aperture hole 1304 that is located through the cylinder 1306. Also included are labyrinth seals 1308 and 1310 located in each of the cylinders 1306 and 1312. The anti-rotation rod 1301, when placed into the locating slot and through the hole 1304 through the cylinder, prevents the rotation of the spindle 1314. As shown, a stepper motor 1313 with a corresponding electrical connector 1315 to provide signals to the stepper motor are shown. In addition, intake slots 1316 allow the intake of air through, for example, the orifice 1320 shown as being a blower intake. In this example, the valve may be coupled to any mattress using, for example, powered CPR, or alternating pressure. A quick evacuation of rotation cells, such as Z cells may be made such as every other cell in a stack of cells in a bed or any other suitable grouping of rotation cells. The rotation cells may be of the type described, for example, in U.S. Pat. No. 7,171,711.

Figure 14:
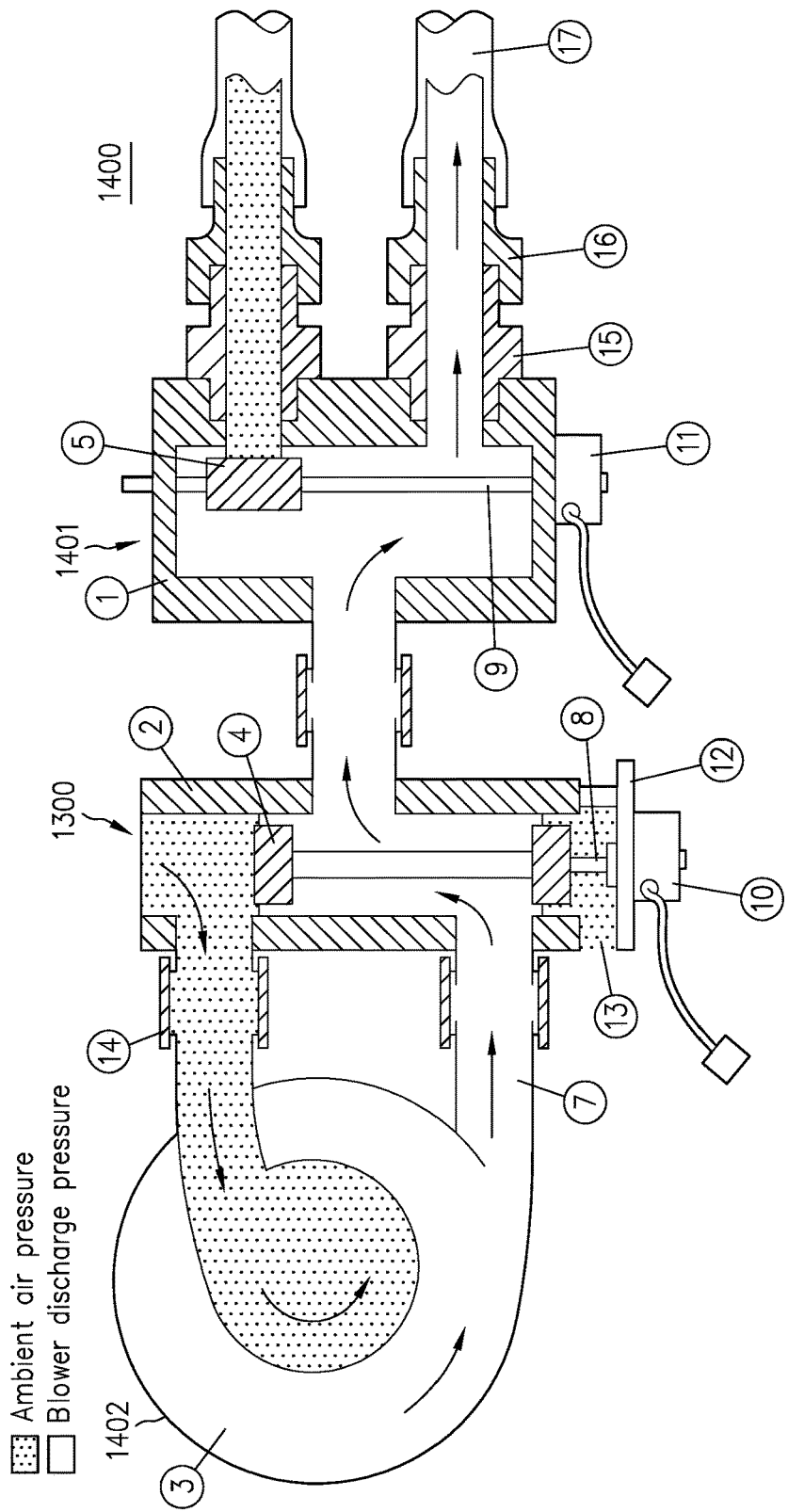
FIG. 14 is an airflow diagram illustrating one example of a valve that incorporates a reverse valve and an alternating pressure control valve.

FIG. 14 is an airflow diagram illustrating, for example, the valve 1300 connected to a block valve 1401. In this example, the system 1400 is shown to include the blower 1402 and air ports A and B being coupled to a mattress, the mattress for example may be a Z cell based mattress as described in U.S. Pat. No. 7,171,711, or any other suitable mattress. The operation shown in 1400 can be described, for example, similar to the diagram of FIG. 10 but with different airflow directions and spindle valve and slide valve positions. The arrows illustrate the fluid flow direction.

Table 1 below shows the components identified in FIG. 14.

TABLE 1

| | |
|---|---|
| 1 | Alternating pressure housing |
| 2 | Reversing valve housing |
| 3 | Blower |
| 4 | Spindle valve |
| 5 | Slide valve |
| 6 | Ambient air intake |
| 7 | Blower air discharge |
| 8 | Spindle lead screw |
| 9 | Slide lead screw |
| 10 | Reversing valve motor |
| 11 | Alternating valve motor |
| 12 | Circle board |
| 13 | Discharge passage |
| 14 | Rubber coupling typ. |
| 15 | Pump hose coupling |
| 16 | Mattress hose coupling |
| 17 | Mattress hose |

Stated another way a system is disclosed that includes a fluid inflatable support such as an inflatable mattress in fluid communication with a fluid flow generating device (e.g. blower) that includes an electronic controller. The spindle valve is coupled to the fluid flow generating device and the fluid inflatable support product. The valve includes a plurality of ports, an electronically controllable spindle valve moveable between a fluid evacuation position and a fluid fill position to control fluid direction through the plurality of ports. The electronic controller is operative to electronically control movement of the spindle valve.

Having described the many embodiments of the present disclosure in detail, it will be apparent that modifications and variations are possible without departing from the scope of the disclosure defined in the appended claims. Furthermore, it should be appreciated that all examples in the present disclosure, while illustrating many embodiments of the disclosure, are provided as non-limiting examples and are, therefore, not to be taken as limiting the various aspects so illustrated. Accordingly, it is intended that the present disclosure not be limited to the described embodiments, but that it has the full scope defined by the language of the following claims, and equivalents thereof.

What is claimed is:

1. An apparatus comprising:
 a fluid inflatable support;
 a fluid flow generating device comprising an electronic controller; and
 a fluid valve, operatively coupled to the fluid flow generating device and the fluid inflatable support, comprising:
  a valve body having a main bore, a first port, a second port, a third port, and a fourth port;
  wherein the first port, the second port, and the third port each comprise a hole in the valve body that is continuous with the main bore and has a center-line axis at a transverse angle relative to a longitudinal axis of the main bore;
  wherein the fourth port is disposed at a proximal end of the main bore closer to the second port;
  an electronically controllable spindle valve moveable between a first state and a second state to control fluid direction through the first port, the second port, the third port, and the fourth port;
 wherein the electronic controller is operative to electronically control movement of the spindle valve; and
 wherein during the first state, the third port and the first port are fluidly connected with each other, and the second port and the fourth port are fluidly connected with each other, and during the second state, the fourth port is closed such that the second port and the third port are fluidly connected with each other.

2. The apparatus of claim 1, wherein the fluid valve comprises a position sensor operative to sense a position of the spindle valve, and a fifth port wherein the spindle valve is operative to block or unblock the fifth port in response to output from the position sensor.

3. A method comprising:
 operating a valve device to control fluid direction in a fluid inflatable support, the valve device comprising: a valve body having a main bore, a first port, a second port, a third port, and a fourth port, and a spindle valve, wherein the first port, the second port and the third port each comprise a hole in the valve body that is continuous with the main bore and has a center-line axis at a transverse angle relative to a longitudinal axis of the main bore, and wherein the fourth port is disposed at a proximal end of the main bore closer to the second port;
 determining if the spindle valve has moved to a position corresponding to a first state based on information from a spindle valve position sensor, wherein during the first state, the third port and the first port are fluidly connected with each other, and the second port and the fourth port are fluidly connected with each other;
 determining if the spindle valve has moved a position corresponding to a second state based on information from the spindle valve position sensor, wherein during the second state, the fourth port is closed such that the second port and the third port are fluidly connected with each other; and
 controlling a fluid flow generating device to evacuate fluid from or adding fluid to the fluid inflatable support through the valve device depending on the determined state.

4. A system comprising:
 a fluid source;
 a first valve, operatively coupled to the fluid source, comprising:
  a valve body having a main bore, a first port, a second port, a third port, and a fourth port;
  wherein the first port, the second port and the third port each comprise a hole in the valve body that is continuous with the main bore and has a center-line axis at a transverse angle relative to a longitudinal axis of the main bore;
  wherein the fourth port is disposed at a proximal end of the main bore closer to the second port; and
  a spindle piston coupled in a bore of the valve body and moveable between a first state and a second state to control fluid direction through the first port, the second port, the third port, and the fourth port, wherein during the first state, the third port and the first port are fluidly connected with each other, and the second port and the fourth port are fluidly connected with each other, and during the second state, the fourth port is closed such that the second port and the third port are fluidly connected with each other;

an alternating pressure control valve operatively coupled to the first valve; and control logic operative to control the first valve and the alternating pressure control valve to provide fluid flow into the first valve and out through the alternating pressure control valve, and to obtain fluid flow through the alternating pressure valve and into the first valve.

5. The system of claim 4, further comprising a mattress in fluid communication with the alternating pressure control valve.

6. The system of claim 4, wherein the first valve further comprises:

an anti-rotation structure operatively coupled to the spindle piston adaptive to prevent rotation of the spindle piston within the bore of the valve body.

* * * * *